United States Patent [19]

Jaubert

[11] Patent Number: 4,734,959

[45] Date of Patent: Apr. 5, 1988

[54] FASTENING DEVICE FOR SPLICING BELTS, SPLICING PROCESS USING SAID DEVICE, AND BELT SPLICED ACCORDING TO SAID PROCESS

[76] Inventor: Claude Jaubert, 18, rue de la Meulonniere, 92500 Rueil Malmaison, France

[21] Appl. No.: 924,639

[22] Filed: Oct. 30, 1986

[51] Int. Cl.⁴ .............................................. F16G 3/08
[52] U.S. Cl. .......................................... 24/38; 24/37; 474/257
[58] Field of Search ............... 24/37, 36, 33, 35, 38, 24/39; 474/257, 204

[56] References Cited

U.S. PATENT DOCUMENTS

| | | | |
|---|---|---|---|
| 2,330,434 | 9/1943 | Lazzell | 24/37 |
| 2,330,435 | 9/1943 | Lazzell | 24/37 |
| 2,446,311 | 8/1948 | Traxler | 474/257 |
| 3,058,864 | 10/1962 | Pechin, Jr. | 24/38 |
| 3,618,384 | 11/1971 | Bierlein | 474/257 |
| 4,489,827 | 12/1984 | Anderson | 24/37 |
| 4,540,389 | 9/1985 | Ramsey | 24/37 |

FOREIGN PATENT DOCUMENTS

| | | |
|---|---|---|
| 2519333 | 11/1976 | Fed. Rep. of Germany . |
| 2813130 | 9/1979 | Fed. Rep. of Germany . |
| 2404153 | 4/1979 | France . |
| 2476247 | 8/1981 | France . |

Primary Examiner—Victor N. Sakran
Attorney, Agent, or Firm—Antonelli, Terry & Wands

[57] ABSTRACT

Fastening device for splicing belts which comprise reinforcing elements made of manmade fabric or metal cords, characterized by the fact that it consists of two lateral plates (1) each comprising on its upper part an end zone (4) forming an angle A of between 15° and 75° with the clamping plane; a central plate (2); and two locking cores (12) making it possible to create a loop with the reinforcing elements from which the rubber covering has been removed at the end of the belt, said locking cores (12) acting by means of a wedging effect between end zones (4) of lateral plates (1) and central plate (2), to ensure that the joint is secure. Applicable to straps and belts and, more particularly, to conveyor belts for elevators.

13 Claims, 5 Drawing Sheets

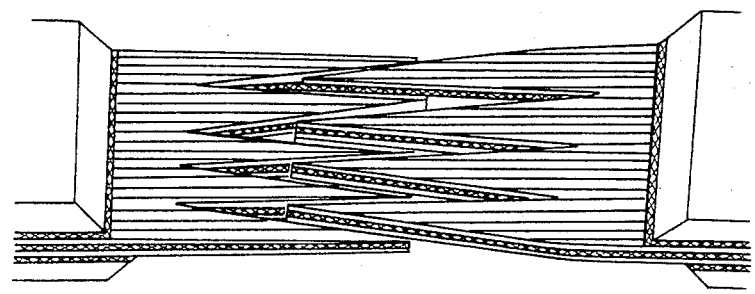
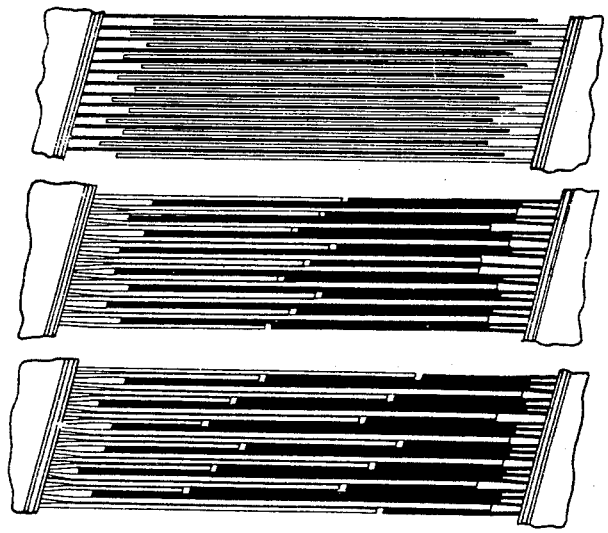
FIG_1
PRIOR ART
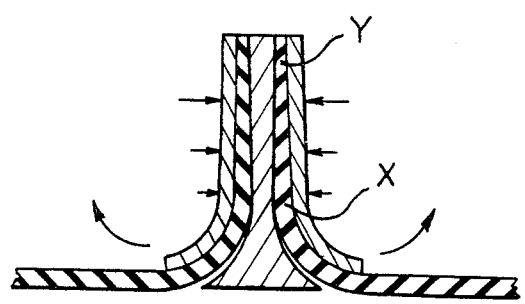
FIG_2
PRIOR ART

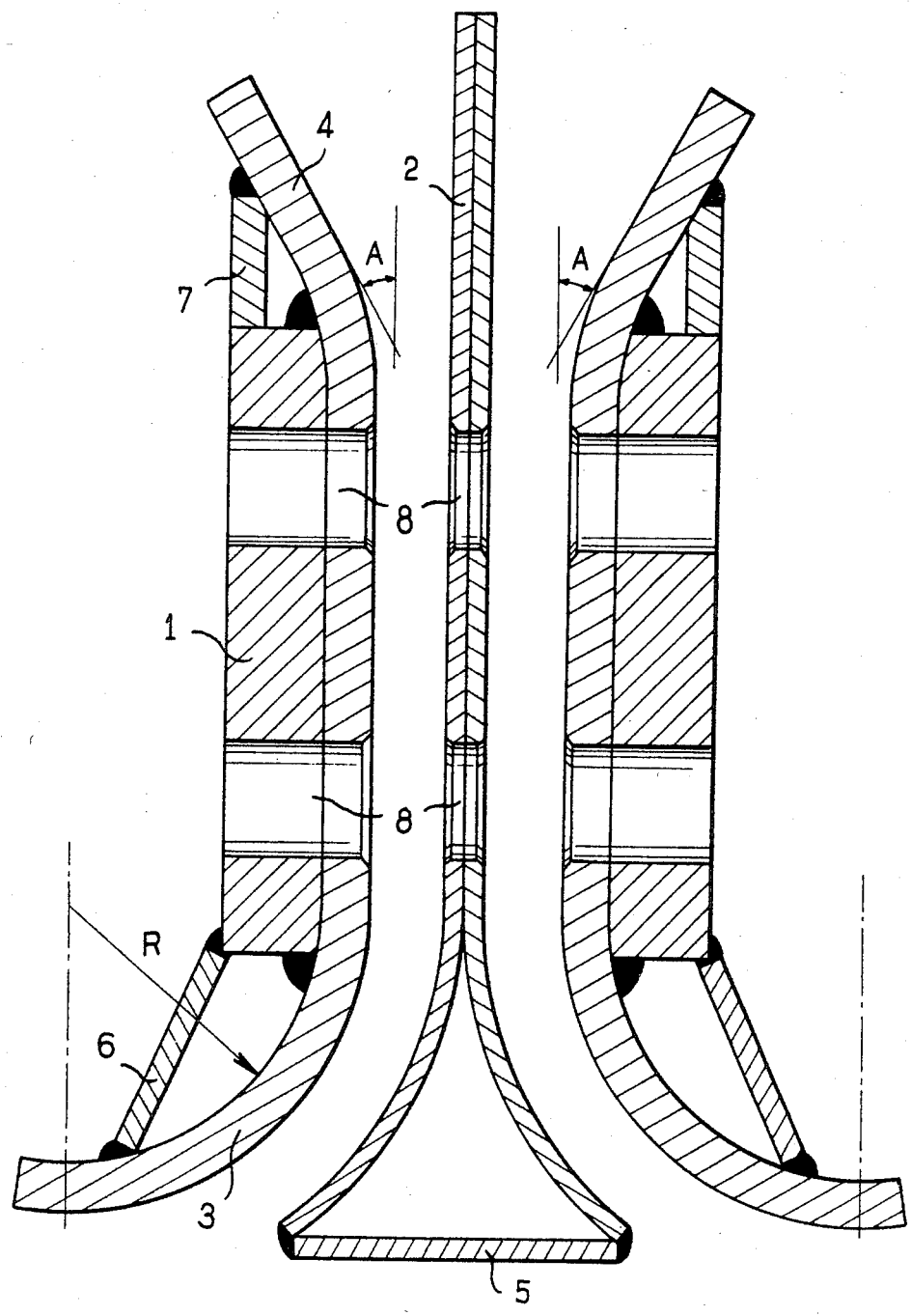
FIG_3

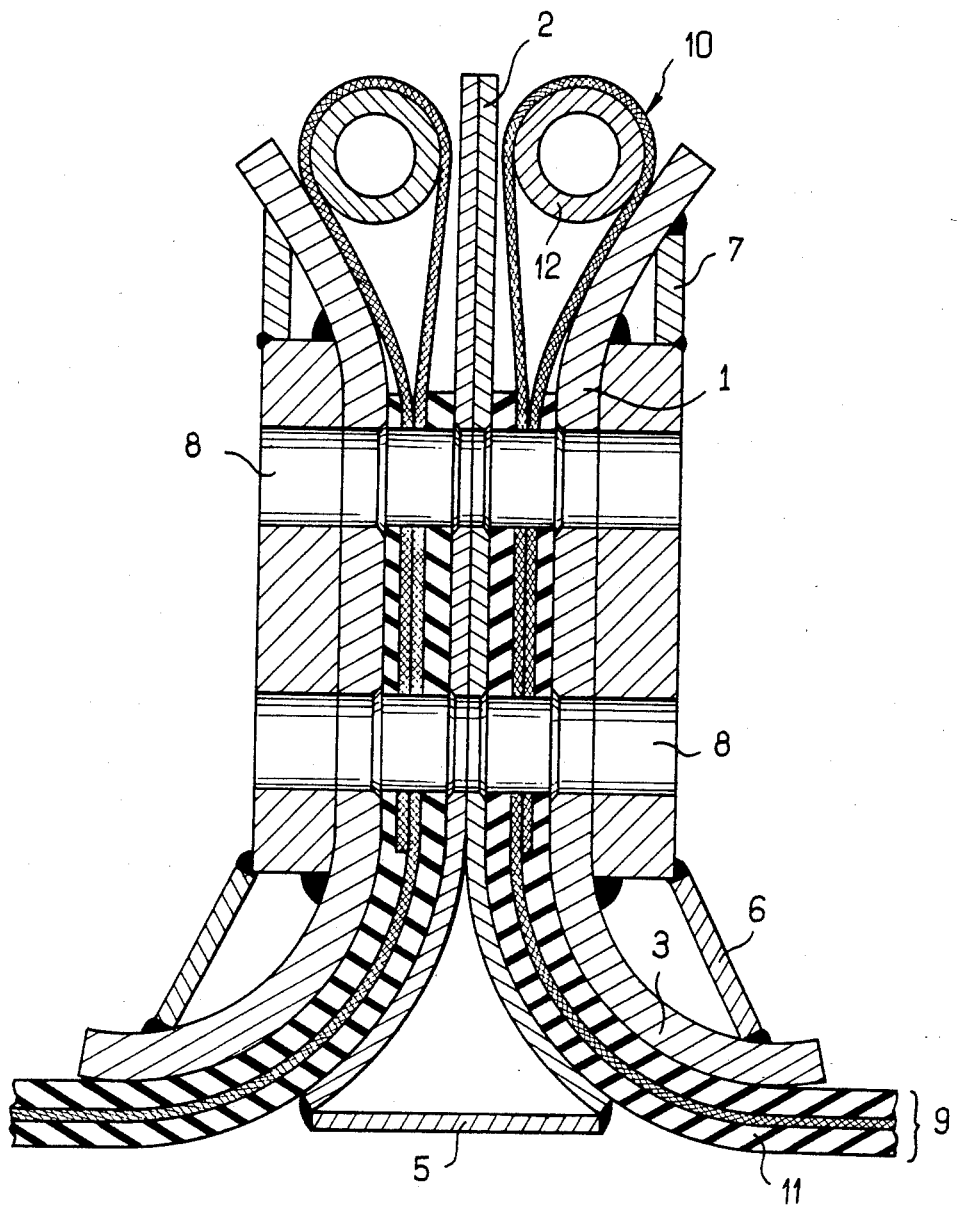
FIG_4

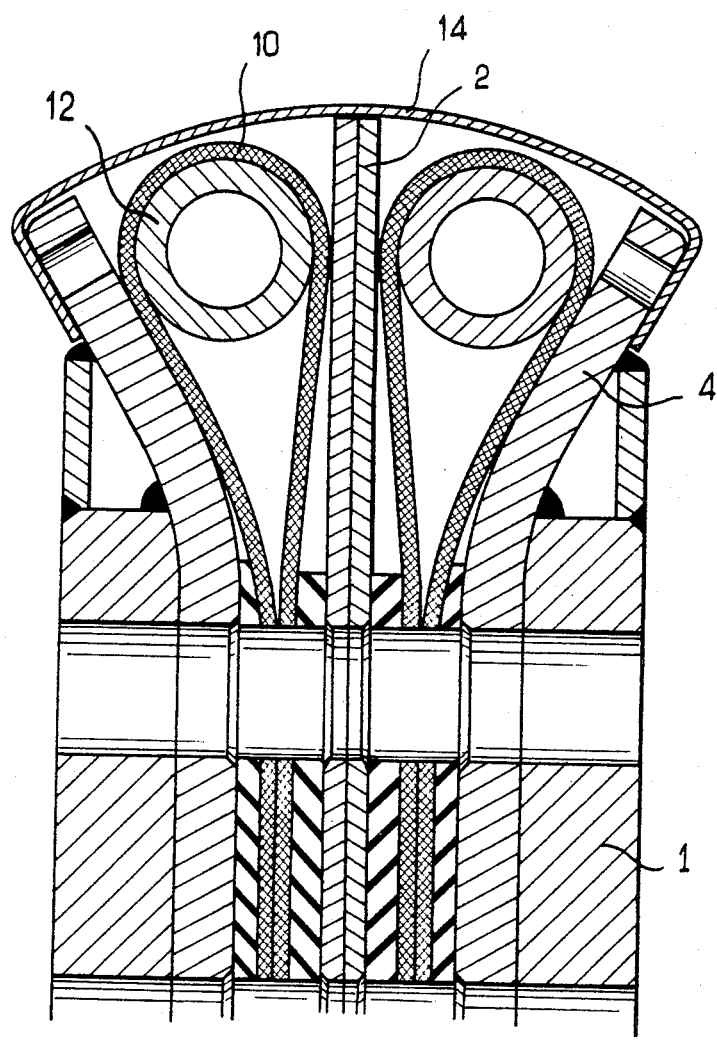
FIG_7

FASTENING DEVICE FOR SPLICING BELTS, SPLICING PROCESS USING SAID DEVICE, AND BELT SPLICED ACCORDING TO SAID PROCESS

The invention concerns belts or straps, more particularly elevator conveyor belts. The invention especially relates to a method and a device for splicing the ends of belts, either to increase their length, or to make them endless by joining the belt to itself in a manner which is reliable during operation. The fastening device as well as the process will be described below, as an example for application to an elevator belt, with the understanding that the device and process are not limited to this use.

One conventional method of splicing the ends of belts is hot splicing after the ends of the reinforcement material have been interlaced.

Various forms of such hot splicing techniques are described in a number of patents, such as DE No. 1,165,354 of Franz Clouth Rheinische Gummiwarenfabrik; FR No. 74.03141 and DE No. 907,996 of Continental Gummi-Werke; FR No. 1,395,634, FR No. 1,582,190 and FR No. 1,440,605 of Pneumatiques, Caoutchouc Manufacturé et Plastiques Kléber Colombes; and U.S. Ser. No. 173,686 of Goodyear Tire and Rubber. One method is recommended in German standard DIN 22131. Another method is described by Mr. Gozdiff of Goodyear in a paper entitled "Factors relating to vulcanized splice reliability for steel cords reinforced conveyor belting", delivered to the 125th Meeting of the Rubber Division, American Chemical Society, in Indianapolis on May 8-11, 1984. Finally, an article by H. P. Lachmann entitled "A survey of present-day conveyor belt technology", published in *Bulk Solids Handling* volume 4, number 4, December 1984, reviews the different technologies that can be used.

Examples of the prior art in hot splicing are illustrated in FIG. 1. There are, however, conditions which make hot splicing techniques inapplicable. For example the length of such a splice may be incompatible with the space available in the sheath or alongside the elevator, or again the mechanical strength may become insufficient to guarantee trouble-free operation of the elevator if the temperature of the products transported or that of the gases circulating in the sheath exceeds 80°-100° C.

Specifically, in the case of interlacing of metal cords, the two ends of the belt(s) are bonded together by the rubber mixture separating the ends of the cords. It is known, however, that as the temperature increases, the mechanical properties of elastomer-based mixtures decrease; the same applies to the bonding forces between the rubber and the metal. As a consequence, the tensile strength of such a splice decreases as the temperature rises.

Taking into account the risks encountered with a splice using hot adhesion and interlacing of metal cords, maintenance engineers have suggested replacing the adhesive bond with a mechanical bond designed to clamp the two ends of the belt(s) against one another. These techniques are referred to as "fastening", and are described, for example, in French Pat. No. 1,320,222 of Pneumatiques, Caoutchouc Manufacturé et Plastiques Kléber Colombes, or in advertising materials of specilized companies such as Goro or Flexco.

The compression force is exerted by metal flanges which are passed through by clamping bolts. The principle applied in mechanically splicing the ends of a belt or belts is theroretically more satisfactory than the hot-adhesion process, but an analysis of phenomena associated with operation of this type of device shows that there is only a slight improvement in operating reliability. This is because the lateral plates have a tendency to move away from one another under the tensile force exerted on the two ends of the belt. To remedy this problem, two lines of bolts are generally used to clamp the plates, with the line of bolts placed closest to the tension zone being designed to limit movement of the plates.

FIG. 2, referring to the prior art in fastening techniques, explains the changes which occur during operation, in terms of distribution of pressure over the belt ends.

When the fastening device is initially clamped, pressure is distributed uniformly over the entire extent of the two clamped ends. When operation begins, the lateral parts are displaced, which tends to decrease the pressure in zone X and increase that in zone Y. As a result of the increased pressure, the rubber mixture located in zone Y tends to be expelled and to creep, i.e. rubber is displaced from the most highly compressed zones towards those least compressed. The effect of this creep is to encourage the clamping plates to move closer together in zone Y, which accentuates the effect.

As confirmation of this analysis, it is commonly found that the second line of bolts has completely loosened, which proves that the stress exerted on the ends of the belt(s) is due not to the bolts but to a rotary movement of the clamping plates. Since the clamping force in zone X has decreased considerably, the strength of such a clip fastener consists only of the retention of the metal cords in zone Y and the frictional forces existing in zone X between the belt and each of the clamping plates. When zone Y is unclamped, an examination of the ends of the belt(s) in said zone shows that the tensile stress has been so high that there has been local destruction of the rubber mixture and of the bond between the rubber and the metal cords. This fact makes the strength of such a clip fastener very problematical, especially when this mechanical effect is combined with the effect of temperature, since it is well known that increased temperature accelerates and facilitates the creep of elastomer-based mixtures, and decreases the strength of the bond between said mixtures and steel cords.

To remedy this problem, it is possible to attempt to increase the pressure exerted by the lateral plates by locking the ends of the metal cords.

Pat. No. DE 2,341,992 of Bernhard Beumer Mashcinenfabrik describes such a solution, in which each metal cords is stripped at its end of its rubber covering, and said end is inserted into a clamping device using screws. Such a technique, time-consuming and difficult to implement, presents a further risk due to the design of the metal cord clamping zone: if the clamping pressure is not properly controlled, there is a definite risk of cutting the metal cord, which would nullify the anticipated effect. In addition, the screws have a tendency to loosen under the action of vibration and temperature, and therefore require constant monitoring.

A different solution, used in particular to lock pretensioning cords in prestressed structures, involves stripping the ends of the metal cords, unstranding them, i.e. untwisting the constituent strands to spread out the end, and pouring around it a metal with a low melting point. This technique is highly reliable when it can be used, but pouring the molten metal requires that the clip fastener be placed in a vertical position, which implies either that one of the drums of the elevator can be moved—which is not always possible—or that the clip fastener can be placed at the top of the elevator, although pouring molten metal onto the ends of metal cords at a height of several dozen meters is tricky and even dangerous. In addition, such a device is practically non-removable, which does not facilitate maintenance of the elevator or replacement of the belt.

The object of the invention is therefore a fastening device and a process for the splicing of belts, more particularly of belts for bucket elevators, which comprise reinforcing elements consisting of metal cords or synthetic textiles. The invention concerns a fastening device consisting of two lateral plates having on their upper part an end zone forming an angle with the clamping plane, a central plate, and two locking cores making it possible to create a loop in the reinforcing elements from which the rubber covering has been removed at the end of the belt and acting by means of a wedging effect between the end zones of said lateral plates and the central plate, to ensure that the joint is secure. Another object of the invention is the process using the device described, and application to an elevator conveyor belt.

The invention aims at inserting into the fastening device an element designed to allow the tensile forces to be taken up by the reinforcing elements alone, without stressing the adhesive bond between the rubber and the reinforcement element and, consequently, to reduce considerably the risk of breakage at the splice due to slippage of the parts of the fastening device.

The characteristics and variants of the invention will be better understood by reading the description below, and referring to the drawings, in which, following FIGS. 1 and 2 illustrating the prior art:

FIG. 3 shows the fastening device used to create the splice in the belt or to make it an endless belt;

FIG. 4 illustrates the splicing process using said fastening device;

FIG. 7 illustrates an improvement to the device allowing protection against contamination.

FIG. 3 shows that the fastening device consists of two lateral plates 1 and a central plate 2.

Figure 5A:
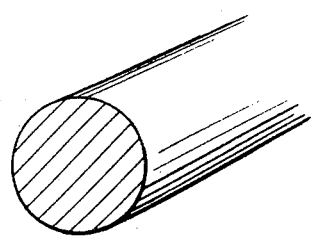
FIG. 5 shows several specific shapes for the locking core.

The lateral plates 1 comprise two end zones 3 and 4, with the end 3 being shaped like the arc of a circle of radius R to allow said belt to be wound under tension without the risk of damage, and the end 4 being bent at an angle A, between 15° and 75°, but preferably with a value close to 30°, to ensure maximum fastening efficiency, with respect to the longitudinal axis of the fastening device. The ends 3 and 4 comprise reinforcement parts 6 and 7.

Plates 2 comprise, at their base, a metal part 5 shaped in cross section like a curvilinear triangle, known in the art, designed to separate the two ends of the belt(s) and to prevent, thanks to its enlarged base, the occurrence of impacts when the splice passes over rollers or drums. Plates 2 are traversed by holes 8 for bolts to pass through.

FIG. 4 shows how the ends of belt 9 are spliced. The reinforcing elements 10 at the end of said belt are stripped of their rubber covering 11 and are curved around a locking core 12, then applied back against the partially stripped portion of the belt corresponding to the fastening zone.

To ensure that said fastening zone has a constant thickness, the length of the stripped reinforced elements corresponds to the length of the loop outside the straight portion of the fastening device, plus the length of said straight portion of the fastening device. The length of the clamping zone is therefore essentially the same as that of the straight part of the central plate 2 of the fastening device.

Assembly involves pinching the ends of the belt(s), prepared as above, between plates 1 and 2 of the fastening device, which in turn are clamped by the bolts passing through them (not shown). Because of the tension exerted by the belt on its ends, the loops formed by reinforcing elements 10 penetrate the angles formed by plate 2 and ends 4 of plates 1 of the fastening device. The reinforcing elements are then locked by the compressive force exerted by locking cores 12. The more the tension increases, the more the clamping force rises, thus reinforcing the reliability of the splice.

In order for the ends of the belt(s) to be able to be wound, without excessive stress, around locking cores 12, said locking cores must have a sufficiently large radius. The minimum value of this radius of curvature is not critical for a fabric-reinforced belt which is fairly flexible, but in cases where the fastening device is used with a belt whose reinforcement consists of metal cords, the radius of curvature r of locking core 12 must be selected in accordance with the diameter of the metal cords. For efficient performance, it must be equal to at least 5 times the diameter of said metal cords, and preferably 8 times, with the upper value of said radius of curvature being limited only by space.

The splice illustrated in FIG. 4 uses hollow cylindrical locking cores 12, but it is obvious that any other shape, such as those proposed in a non-limiting manner in FIGS. 5a–5d would be suitable.

Figure 5B:
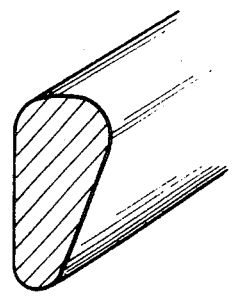
Figure 5C:
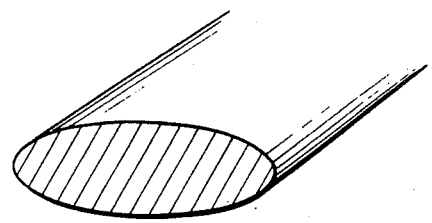
Figure 5D:
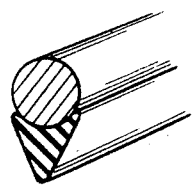

FIG. 5a shows a locking core with a solid circular cross section, while FIG. 5b illustrates a locking core with a triangular section with rounded corners, and FIG. 5c shows a core with an oval section: the only condition is that these locking cores be capable of becoming wedged, under tensile forces, between plate 2 and ends 4 of plates 1 without damaging the reinforcing elements. Locking cores 12 are most often made of metal, but they can be made, as a non-limiting example, of composite materials with a rigid matrix or of rubber reinforced with textile or metal fillers or fibers. They can also be made of a combination of several materials, such as a metal part and an extension made of a rubber-based mixture, as in FIG. 5d.

The stripped reinforcing elements of the belt are protected against corrosion, dust contamination, chemical attack and wear due to contact with plates 1 and 2 of the fastening device or with locking cores 12 by winding on a thin sheet of rubber or fabric.

Figure 6:
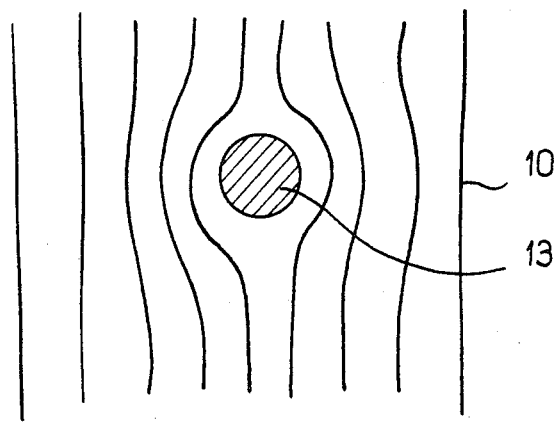
FIG. 6 shows a specific configuration making it possible to improve the quality of the splice.

In order to increase the efficiency of the splice by limiting the number of reinforcing elements cut in the area where the bolts pass through, it is possible, during assembly, to arrange said reinforcing elements 10 in such a way that they are diverted from their initial path around the shafts of said bolts 13, as diagrammed in FIG. 6. This operation is performed with a suitable tool, for example one with a tapered point well known to the person skilled in the art, or by molding and vulcanization. In the type of splice proposed, it is customary, in order to increase the clamping surface area, to provide two rows of bolts, which should preferably be placed in a single line and not offset, to limit the number of reinforcing elements affected by the passage of said bolts.

In order for locking core 12 to produce a wedging effect, the clamping force of the bolts must be sufficiently high. Experience shows that initial tightening of 30 to 50 m.kg for bolts 20 mm in diameter is necessary.

As mentioned previously, the reinforcing elements are protected by an applied covering, but to increase this protection further, it is possible, as illustrated in FIG. 7, to place over the upper part of the fastening device a cap 14, most commonly made of sheet metal, which is attached, for example by means of screws, onto ends 4 of plates 1 of the fastening device. Watertightness is completed by applying a putty or other formable material.

To illustrate the efficacy of the splicing device which is the object of the invention, the following tests were conducted. Three identical belts, with a nominal strength of 1250 N/mm, were made into endless belts:

(1) with a standard commercial clip fastener, not using a locking core and therefore acting only by clamping (belt 1);

(2) with the fastening device which is the object of the invention, in which passage of the through bolts leads to a certain number of cuts in the reinforcing elements (belt 2);

(3) with the fastening device which is the object of the invention, using the technique of diverting the reinforcing elements as illustrated in FIG. 6 (belt 3).

The resulting spliced belts were mounted on a tensile-strength measurement bench consisting of two cylindrical drums with parallel axes. By progressively moving the two drums apart, the tension exerted on the loop consisting of the endless belt is increased until the belt breaks, and the maximum applied force is recorded.

The "efficiency" of the splice is defined as the ratio, in percent, of the maximum recorded force to the nominal strength of the belt. The results obtained are shown in the table below:

| Reference | Type of fastening | Efficiency |
|---|---|---|
| Belt 1 | Commercial clip fastener | 51% |
| Belt 2 | Wedge-effect fastener | 68% |
| Belt 3 | Wedge-effect fastener + diversion of reinforcing elements in perforation zone | 80% |

This shows that the fastening system which is the object of the invention, which uses a locking core to produce a wedging effect, makes it possible to create a splice in the ends of a belt or belts under simple conditions, similar to those of conventional clip fasteners, under safe conditions since there is no need to handle molten metal, and in such a way that the splice is reliable even under difficult utilization conditions such as high temperatures or high operating tensions.

The person skilled in the art may, of course, make various modifications to the device, the process and the applications described above and illustrated as non-limiting examples, without departing from the framework of the invention.

I claim:

1. A fastening device for splicing belts having rubber coverings and reinforcing elements made of synthetic fabrics or metal cords, which comprises two lateral plates, each plate comprising on an upper part an end zone forming an angle A of between 15° and 75° with a clamping plane extending between said plates; a central plate located between said lateral plates; and two locking cores, each core being positioned between the central plate and an end zone of one of the lateral plates; whereby reinforcing elements from which the rubber covering has been removed at ends to be spliced can be looped about respective locking cores and said locking cores being drawn inwardly towards the clamping plane to provide a wedging effect on the reinforcing elements between the end zones of the lateral plates and the central plate, thereby providing a secure joint between the belt ends to be spliced.

2. A fastening device for splicing belts according to claim 1, wherein the angle A of the end zone of each of the lateral plates with the central plate is between 20° and 35°.

3. A fastening device for splicing belts according to claim 1 or claim 2, wherein the locking cores are made of metal.

4. A fastening device for splicing belts, according to claim 1 or claim 2, wherein the locking cores are made of a composite material with a rigid matrix.

5. A fastening device for splicing belts according to claim 1 or claim 2, wherein the cores are made of a rubber-based mixture reinforced with fabric, metal fillers or metal fibers.

6. A fastening device for splicing belts according to claim 1 or claim 2, wherein each of the locking cores is composed of at least two materials including a rigid material for contacting the reinforcing elements and a rubber base material for contacting an end zone of a lateral plate and the central plate.

7. A fastening device for splicing belts according to claim 1, wherein the reinforcing elements of the belt ends to be spliced are metal cords and the radius of curvature r of a part of the locking core in contact with the metal cords is equal to at least 5 times the diameter of said cords.

8. A fastening device for splicing belts according to claim 1, wherein a cap for providing protection to the uncovered reinforcing elements against contamination and weather is attached to an upper part of the device and made water-tight by a putty.

9. A process for splicing belts having rubber coverings and reinforcing elements together with a fastening device having two locking cores and lateral plates which comprises stripping rubber coverings from the reinforcing elements of two belt ends to be spliced; looping the stripped reinforcing elements of each end about a respective locking core located between a respective lateral plate and a central plate of the fastening device, with each stripped reinforcing element that has been looped over a respective core being placed in contact with a portion of a respective belt located within a clamping zone of the fastening device; assembling the lateral plates and the central plate together by bolts extending therethrough; and drawing each respective locking core inwardly into a space between each respective lateral plate and the central plate to provide a wedging effect on the reinforcing elements.

10. A process according to claim 9, wherein a clamping length of the belt ends within the fastening device is equal to a straight length portion of the central plate of the device.

11. A process according to claim 9 or claim 10, wherein the reinforcing elements in the vicinity of the bolts for securing the lateral plates and central plate are diverted from their initial paths so as not to be cut by the bolts.

12. A process according to claim 9, wherein the stripped reinforcing elements of each belt end are inserted between one of the lateral plates and the central plate prior to being looped over a locking core.

13. A conveyor belt for an elevator which comprises a fastening device and a belt having two ends spliced together by the fastening device to form an endless belt; said fastening device comprising two lateral plates, each plate comprising on an upper part an end zone forming an angle A of between 15° and 75° with a clamping plane extending between said plates; a central plate located between said lateral plates; and two locking cores, each core being positioned between the central plate and an end zone of one of the lateral plates; reinforcing elements from which the rubber covering has been removed at each end of said belt being looped about the locking cores and said locking cores being drawn inwardly towards the clamping plane to provide a wedging effect on the reinforcing elements between the end zones of the lateral plates and the central plate, thereby providing a secure joint between the belt ends to be spliced.

* * * * *